March 29, 1966 W. J. STARK ET AL 3,243,770
FIRST-KICK RELAY SWITCHING METHOD
Filed July 20, 1962 4 Sheets-Sheet 1

WILLIAM J. STARK
JOHN S. HUTCHISON INVENTORS

BY *James A. Reilly*
ATTORNEY

WILLIAM J. STARK
JOHN S. HUTCHISON INVENTORS

BY *James A. Reilly*
ATTORNEY

March 29, 1966 W. J. STARK ET AL 3,243,770
FIRST-KICK RELAY SWITCHING METHOD
Filed July 20, 1962 4 Sheets-Sheet 3

WILLIAM J. STARK
JOHN S. HUTCHISON INVENTORS

BY *James A. Reily*
ATTORNEY

March 29, 1966 W. J. STARK ET AL 3,243,770

FIRST-KICK RELAY SWITCHING METHOD

Filed July 20, 1962 4 Sheets-Sheet 4

WILLIAM J. STARK
JOHN S. HUTCHISON INVENTORS

BY James A. Reilly
ATTORNEY

United States Patent Office 3,243,770
Patented Mar. 29, 1966

3,243,770
FIRST-KICK RELAY SWITCHING METHOD
William J. Stark and John S. Hutchison, Tulsa, Okla., assignors, by mesne assignments, to Esso Production Research Company, a corporation of Delaware
Filed July 20, 1962, Ser. No. 211,268
7 Claims. (Cl. 340—15.5)

This invention relates to a system of geophysical prospecting. More particularly the invention relates to a first-kick switching system for use in geophysical prospecting. Still more particularly, the invention relates to a geophysical prospecting system having a multiplicity of seismic detection stations connected to a central recording mechanism, including means at each detection station whereby first-kick seismic energy is detected by a first-kick geophone and subsequently received seismic energy is detected by reflection geophone means.

In geophysical prospecting, as most commonly practiced, a cable connects a central recording mechanism with a multiplicity of detection stations which normally extend in a straight line in opposite directions from the central recording mechanism. The distance between the individual recording stations may be several hundred up to several thousand feet. In order to determine the character of subsurface formations a seismic shock is introduced at or below the surface of the earth, usually created by the explosion of a dynamite charge. The seismic energy wave emanating from the dynamite charge travels outwardly and downwardly and is detected at each of the detection stations along the cable. The seismic energy detected at each detection station is individually recorded at the central recording mechanism.

After the explosion of a dynamite charge to initiate a seismic shock, a portion of the produced seismic energy travels along or just below the surface of the earth. This surface wave, called first-kick seismic energy, taking a more direct route from the blast, arrives at each detection station in advance of the arrival of reflected seismic energy. The reflected seismic energy is usually of a smaller amplitude than the directly received energy.

It has been learned that connecting several geophones together to combine their signals at each detection station more faithfully reproduces the reflected seismic energy. Usually these geophones are placed at each station in a field which may cover an area as much as 400 feet by 400 feet. The reflected energy from below the surface of the earth travels substantially vertically as it reaches each detection station. For this reason the multitude of geophones at each detection station receives the substantially vertical traveling energy uniformly and the combination of several geophones helps produce a better electrical signal representing the reflected energy. This is not true as far as the first-kick or surface energy is concerned. Since the first-kick energy travels primarily horizontally, geophones set in a pattern receive the energy waves at varying times as the first-kick energy wave passes through the field of geophones. A field or pattern of geophones which produces superior electrical signals from the detection of substantially vertically traveling reflected seismic energy does not produce good first-kick results. In contrast, more clearly defined first-kick information is available as received from a single geophone.

It is therefore an object of this invention to provide a geophysical prospecting system having a multiplicity of seismic detection stations connected to a central recording mechanism, including means at each detection station whereby first-kick seismic energy is detected by a first-kick geophone and subsequently received seismic energy is detected by reflection geophone means.

Another object of this invention is to provide a system for use in geophysical prospecting, including means for sequentially switching first-kick and reflection geophone means at each detection station so that first-kick seismic energy is received on first-kick geophone means and subsequently received seismic energy is received on reflection geophone means.

Another object of this invention is to provide a first-kick switching system for use in geophysical prospecting having at each detection station a first-kick geophone means, a reflection geophone means and relay means connecting the two geophone means to a central recording mechanism, wherein at the time of receiving first-kick seismic energy the first-kick geophone means is switched in communication with the central recording mechanism by the relay means and subsequent to receiving first-kick seismic energy the first-kick geophone means is switched out and the reflection seismic means is switched into communication with the central recording mechanism.

Another object of this invention is to provide a first-kick relay switching system for use in geophysical prospecting having a series of detection stations connected by a cable to a central recording mechanism. The cable has a pair of conductors extending from the central recording mechanism to each of the detection stations, and each detection station is provided with a first-kick geophone means and reflection geophone means. A relay is included at each detection station to sequentially switch the first-kick geophone means and the reflection geophone means into communication with the pair of conductors. Initially the first-kick geophone means at each detection station is switched by said relay to communicate by said conductors with said central recording mechanism. Subsequent to the receipt at each detection station of first-kick seismic energy, however, the relay means switches the reflection geophone means into communication with said pair of conductors.

Another object of this invention is to provide a first-kick switching system for use in geophysical prospecting wherein a multitude of detection stations are connected —each by a pair of conductors—in a cable with a central recording mechanism. Each detection station is provided with a first-kick geophone means, reflection geophone means and a relay switching means to switch either of said geophone means into communication with said conductors—all of said relay switching means being connected in parallel. Means are included at said central recording mechanism to impose a sloped voltage on the paralleled relays to sequentially switch the first-kick geophone means out of communication with said conductors and the reflection geophone means into communication with said conductors subsequent to the receipt of first-kick seismic energy at each detection station.

Another object of this invention is to provide a circuit for the generation of a sloped voltage used to control first-kick switching relays in a geophysical prospecting system.

Another object of this invention is to provide a circuit for the generation of a sloped voltage for controlling first-kick relays in a geophysical prospecting system wherein the circuit utilizes semi-conductor elements.

These and other objects and a better understanding of the invention may be had by referring to the following description and claims taken in conjunction with the attached drawings in which:

Figure 1:
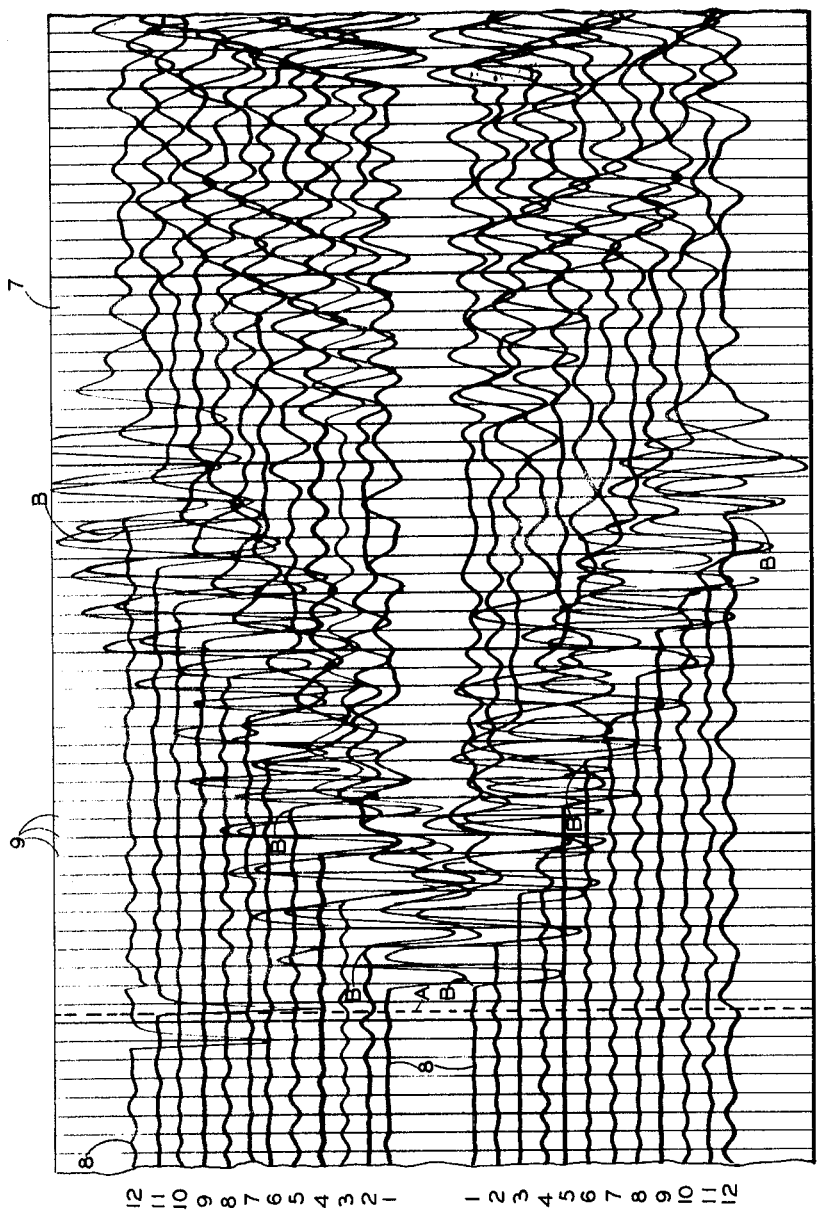
FIGURE 1 depicts a portion of a typical seismic record showing graphically the receipt of seismic information at each of twenty-four different detection stations.

This invention may be described as a first-kick switching system for use in geophysical prospecting. More particularly, but not by way of limitation, the invention may be described as a method of obtaining a geophysical prospecting record comprising the steps of initiating at a shot point a seismic disturbance; detecting, at a multiplicity of detection stations positioned at the surface of the earth in spaced relationship relative to said shot point, first-kick seismic energy; individually recording the first-kick seismic energy detected at each of said detection stations; detecting at each of said detection stations reflected seismic energy received subsequent to said first-kick seismic energy; and individually recording said reflected seismic energy detected at each of said detection stations.

The system of geophysical prospecting most frequently used in the oil industry provides a record taken from the effect of a seismic shock as generated by the blast from an explosion of dynamite at or below the surface of the earth. Geophones are positioned at detection stations in a spaced relationship from each other usually in lines formed in opposite directions from a central recording mechanism. Just prior to the blast a record medium, being usually either a photosensitive paper or magnetic tape, is started to move in a recording mechanism. As seismic energy reaches the geophones at each detection station the energy is detected by the movement of the geophones. This movement is converted into an electrical signal which is transmitted back to the central recording mechanism over a cable. At the central recording mechanism the electrical output of each detection station is recorded. There is normally one trace on the record for each detection station.

When a blast is initiated, seismic disturbances are propagated in the nature of sound waves in all directions from the point of blast. Some of the propagated energy travels substantially parallel to the earth's surface. This surface wave of energy traveling the fastest velocity path between the point of the explosion and the detection stations, is the first energy to reach the detection stations. It is termed first-kick seismic energy, and the corresponding record produced on the recording oscillogram is referred to as the first-kick information.

A portion of the seismic disturbance energy created by the blast travels downwardly. As the wave of energy progresses downwardly each strata of the earth reflects a portion of the seismic energy. This reflected energy is detected as it arrives at each of the detection stations. It is the reflected energy which produces the greatest amount of information as to the depth and character of the substrata formations. The path resulting in the reflection of seismic energy is much longer than the direct path of the surface energy wave and is therefore received subsequent to the first-kick information.

The energy reflected from formations, especially those formations which lie at deeper depths within the earth, is very feeble. It has therefore become a common practice in recent years in geophysical prospecting, to utilize more than one geophone at each detection station to produce a more faithful and significant reproduction of the reflected energy. In fact, geophysical prospecting crews surveying in areas where geophysical information is difficult to obtain, frequently use a whole field of geophones sometimes covering an area of 160,000 square feet at each detection station. Where many geophones are used, the electrical output of all of the geophones is combined to feed one pair of conductors leading back to the central recording mechanism to produce one trace of information on the record. The energy reflected from subsurface formations, particularly the deepr and more significant formations, travels primarily in a vertical direction. The reflected energy therefore arrives at each detection station primarily as a vertical vector so that the reflected energy waves encounter a field of geophones at a given detection station substantially simultaneously. By the use of a multiplicity of geophones the reflected signals are added complementary to each other to produce a summated electrical output. This is not true, however, of the surface or first-kick seismic energy traveling primarily horizontally of the earth's surface. The horizontally traveling wave arrives at various geophones positioned in a field at a detection station at different intervals since the geophones will be at different distances from the point of the blast. Thus, it is not desirable to detect first-kick energy by a multitude of widely-spaced geophones at a detection station. Instead, the first-kick energy is best detected by a single geophone at each station. Alternatively, it may be detected by a small array of geophones spaced sufficiently close to one another to respond essentially as a single geophone.

It can thus be seen that reflected energy is best detected on a multiplicity of geophones and that first-kick energy is best detected on a single geophone. This invention provides a method of accomplishing such results.

FIGURE 1 discloses a portion of the length of a seismograph record 7 as typically obtained on photosensitive paper. The record 7 shown in FIGURE 1 discloses traces depicting the formation obtained from a spread of twenty-four detection stations extending in a straight line.

Typically there are twelve detection stations in a spread, the information from each detection station producing a trace 8 on the record 7. Timing lines 9 on the record 7 provide time reference of the recorded information. Following the initiation of a blast or other seismic disturbance indicated at time A on record 7, the first substantial deviation of traces 8 is produced by the arrival of first-kick seismic energy at each of the detection stations, indicated at points B of traces 8.

After the arrival and passage of the first seismic energy the reflected energy arrives and is recorded. This invention provides a means of utilizing a single pair of conductors for each detection station extending to the central recording mechanism in a manner to convey information from both a single first-kick geophone and from one or more reflection geophones. The invention provides a method of automatically switching the conductors leading to each detection station so that prior to the arrival of first-kick seismic information a single first-kick geophone is connected across the conductors. Subsequent to the arrival of the first-kick information the first-kick geophone is switched out of the circuit and one or more reflection geophones are switched into the circuit.

Figure 2:
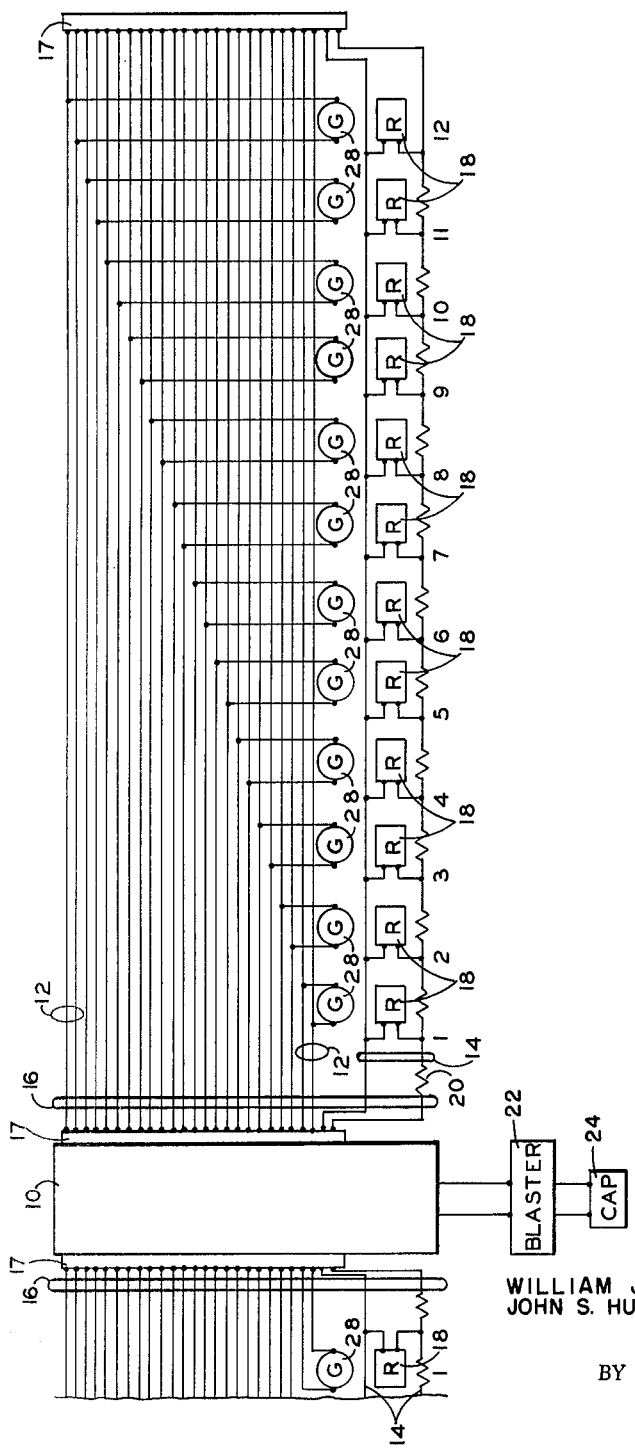
FIGURE 2 is a schematic diagram of a portion of a geophysical recording system depicting a central recording mechanism connected by means of a cable wih geophones at a multiplicity of detection stations.

The basic circuit arrangement of the invention is shown in FIGURE 2. A central recording station 10 is of the typical and commonly used type having facilities for receiving, amplifying and recording electrical signals from a multiplicity of detection stations. A pair of conductors 12 extends from the central recording mechanism to each of the detection stations. There are typically twelve stations in a forward direction from the central recording mechanism 10, and twelve stations in a rearward direction. In FIGURE 2 twelve detection stations are shown, numbered 1 to 12, extending in one direction from central recording mechanism 10. Typically, twelve detection stations will extend in a line in the opposite direction from the central recording mechanism, although only one station is shown for purposes of simplifying the diagram.

The electrical signal transmitted from each detection station travels over the pair of conductors 12 from each such station back to the central recording mechanism 10. In addition to the twelve pairs of geophone conductors 12 leading in both forward and rearward directions from the central recording mechanism 10, this invention incorporates the use of an additional pair of conductors in each direction designated as relay conductors 14. Relay conductors 14 carry a voltage to perform a switching function at each detection station in a manner to be described subsequently.

The twelve pairs of geophone conductors 12 and the one pair of relay conductors 14 make up a cable 16 which extends in both directions from the central recording mechanism 10 to the detection stations.

Connector members 17 are provided by which cables 16 are electrically connected to the recording mechanism 10. Typically, a connector member 17 is placed at each end of cables 16 for convenience purposes, although at any one time only one connector member 17 of each cable 16 is used to connect to the recording mechanism. At each of the detection stations relay conductors 14 connect with a paralleled relay 18. The relay conductors 14 have inherent resistance between each detection station indicated by resistance symbols 20.

Shown connected to central recording mechanism 10 is a blaster 22 which ignites, on signal, a blasting cap 24 which in turn, sets off a dynamite charge to initiate a seismic energy wave. The seismic energy travels from the blast created by firing of blasting cap 24 to ultimately reach each of the detection stations.

Figure 4:
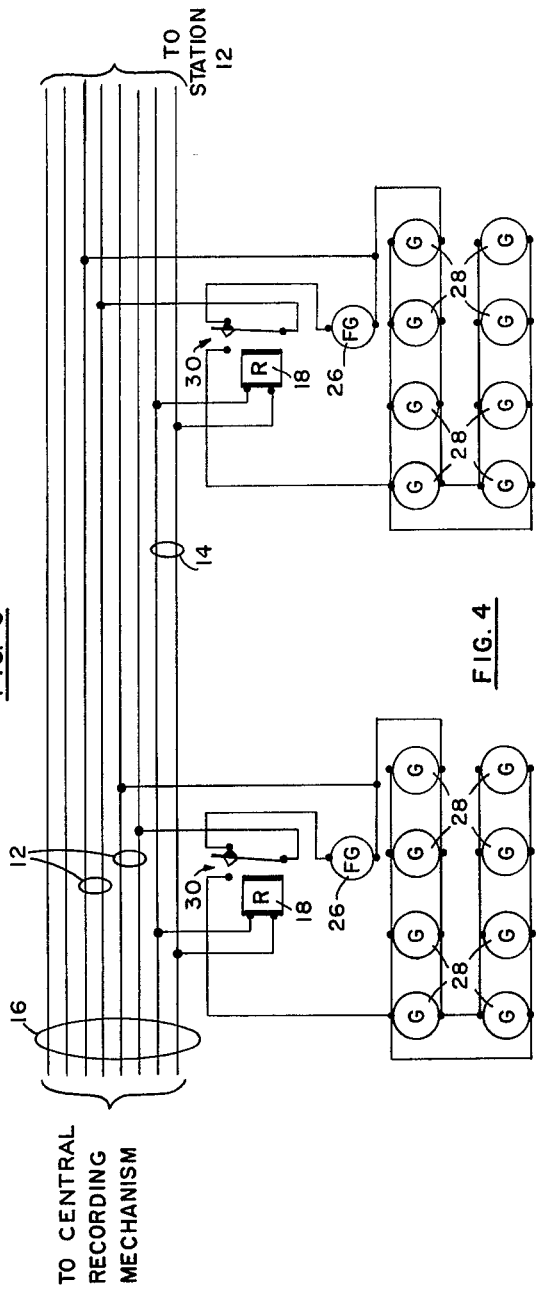
FIGURE 4 is a schematic diagram of the arrangements of first-kick geophone means and reflection geophone means at two recording stations along a cable.

Referring now to FIGURE 4 the circuitry arrangement at each detection station is best shown there. FIGURE 4 specifically shows the circuit arrangement at detection stations 10 and 11, the circuit arrangement being identical at each of the other detection stations.

At each detection station switching relay 18 is connected in parallel with relay conductors 14. At each detection station is positioned a first-kick geophone 26. This will normally be a single geophone particularly adapted to detect the first-kick seismic information. Also positioned at each detection station is one or more, and usually a multiplicity of reflection geophones 28. These are usually spaced on the earth in some prearranged geometrical pattern. The reflection geophones 28 may be placed in combinations of series and parallel arrangements. Regardless of the pattern or arrangement, however, the field of reflection geophones 28 produces a single electrical signal which is delivered back to the central recording mechanism on the pair of geophone conductors 12.

In this invention switching relay 18 is provided with contacts 30 so that in the nonenergized condition the single first-kick geophone 26 is placed in contact with the pair of geophone conductors 12. In the energized position first-kick geophone 26 is taken out of the circuit and the reflection geophones 28 placed in the circuit to feed the electrical signal on the pair of geophone conductors 12 back to the central recording mechanism. Thus, by maintaining each of the relays 18 in the nonenergized condition prior to the receipt of the first-kick energy at each detection station, the first-kick energy will be fed to conductors 12 by first-kick geophones 26. After the arrival of the first-kick energy at each detection station, relay 18 is energized, so that subsequently received seismic energy is detected by the reflection record geophones 28, and fed back to the central recording mechanism on conductors 12.

An important novel aspect of this invention is the provision of means for sequentially energizing relay 18 at each of the detection stations in the correct time relationship such that prior to the arrival at each detection station of first-kick energy the relay 18 is not energized. Subsequent to the arrival of the first-kick energy and before the arrival of reflection energy, relay 18 is energized. This is accomplished by introducing onto relay conductors 14 a slope voltage in a controlled time relationship relative to the initiation of the seismic disturbance.

Figure 3:
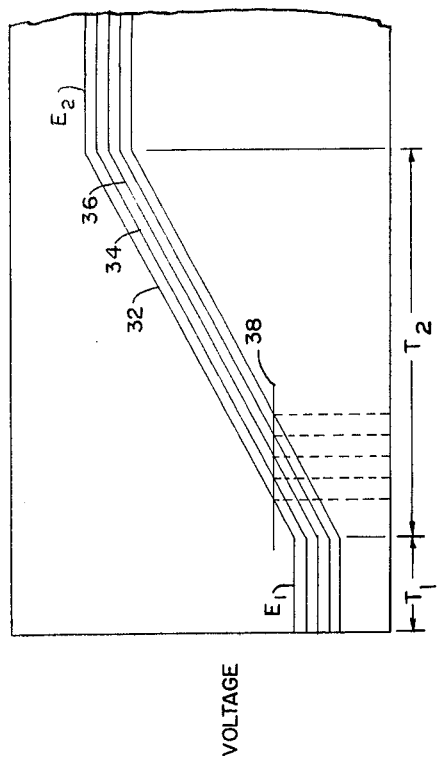
FIGURE 3 is a graph of voltages as typically imposed on switching relays as utilized in this invention.

Referring to FIGURE 3, the method of utilization of a slope voltage is best shown. Subsequent to the initiation of a seismic disturbance a sloped voltage is impressed on relay conductors 14 at the central recording mechanism. A graph of the voltage relative to time is indicated in FIGURE 3 by the numeral 32. Due to the normal resistance 20 caused by the length of relay conductors 14 between each of the detection stations, the voltage at each succeeding detection station will be diminished. For instance, the voltage applicable across relay 18 at detection station 3 is indicated by the numeral 34. The voltage at relay 18 at detection station 6 is indicated by numeral 36, and so forth. Ignoring transients introduced by capacitance and inductance of conductors 14, the voltage at relay 18 at each of the detection stations will be of the same time relationship but of diminished amplitude due to the voltage drops imposed by resistances 20 in the relay conductors 14.

With each relay 18 set to energize at the same given voltage level indicated by the numeral 38 on the graph of FIGURE 3, the sloping voltage introduced on conductors 14 sequentially energizes relay 18 at each of the detection stations.

In this manner, by applying a sloped voltage to sequentially energize relays 18, and by the circuit arrangement as shown in FIGURES 2 and 4, a system is provided for detecting the first-kick seismic energy on a first-kick geophone 26 and subsequently detecting reflected seismic energy on reflection geophones 28 at each detection station. This is accomplished without requiring any changes in the recording systems of the central recording mechanism, without requiring additional channels of amplification, and without requiring additional cables other than the simple provision of one extra pair of relay conductors 14, in both of the cables 16 leading from the central recording mechanism 10.

In most instances cables 16 as utilized in geophysical prospecting are provided with at least one extra pair of conductors which may be utilized for communication purposes. In this event conductors 14 may be utilized not only for the actuation of relays 18, but also for other services such as providing voice or sound power communication.

Figure 5:
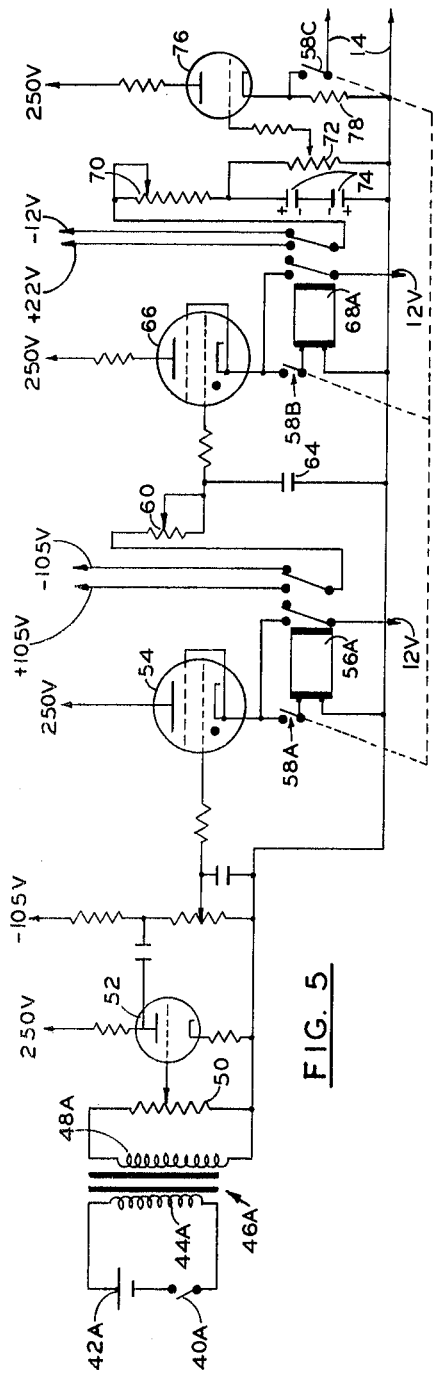
FIGURE 5 is a schematic diagram of a circuit for providing a slope voltage used to control a switching relay at each of a multiplicity of detection stations by the system of this invention.
Figure 6:
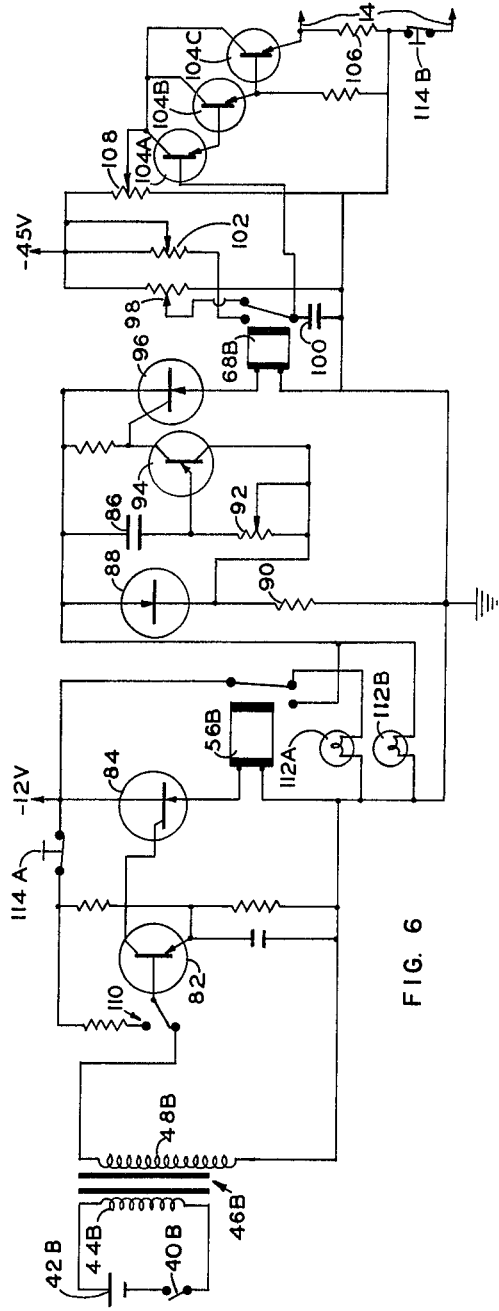
FIGURE 6 is a schematic diagram of a circuit for providing the slope voltage necessary to control the switching relay at each of a multiplicity of detection stations by the system of this invention, this circuit utilizing semiconductor devices.

FIGURE 5 discloses a circuit adaptable to perform the function of this invention of producing a time controlled sloped voltage for the sequential closing of relays 18. FIGURE 6 discloses a circuit adaptable to accomplish the same result. The circuit of FIGURE 5 uses conventional electronic vacuum tubes, while the circuit of FIGURE 6 is designed to use semi-conductor devices.

Referring first to FIGURE 5 a slope voltage is initiated by a voltage trigger pulse, such as by closing or opening switch 40A which has a battery 42A and a primary coil 44A of transformer 46A in series therewith. Change in current flow in coil 44A introduces a voltage pulse in the secondary coil 48A which is communicated by means of potentiometer 50 to the grid of an amplifying tube 52. The actuation of switch 40A may be controlled in various ways by the central recording mechanism to initiate a pulse substantially simultaneous with the actuation of a firing circuit—i.e., to initiate a blast as blasting cap 24 (FIGURE 2) is fired. As an alternate arrangement an uphole geophone positioned adjacent to the blast hole may be used to initiate a voltage pulse to tube 52.

A voltage pulse output of tube 52 is fed to the grid of a normally nonconducting thyratron tube 54. The voltage pulse fires thyratron tube 54 energizing relay 56A. A reset switch 58A in series with relay 56A is normally closed and serves a function which will be described subsequently. When relay 56A is energized, thereby closing the relay contacts, a twelve volt source is placed across relay 56A so that it is held closed. In addition, a voltage across potentiometer 60 in series capacitor 64 is switched from −105 volts to +105 volts. Thus, in effect, simultaneous with the firing of a shot a positive voltage is placed across potentiometer 60 and capacitor 64.

As soon as relay 56A energizes, capacitor 64 starts to charge in a positive direction and as it charges an increasing voltage is applied to the grid of a second thyratron tube 66. When a critical voltage is reached on the grid of thyratron tube 66 it fires, closing relay 68A. The time lapse between the closing of relay 56A and the closing of relay 68A is adjusted by potentiometer 60 which controls the rate at which capacitor 64 charges. Referring to FIGURE 3 the time lapse between the initiation of a seismic shot, or the application of a firing voltage on the grid of thyratron 54, and the firing of thyratron 66 to close relay 68A, constitutes time delay $T_1$.

A normally closed reset switch 58B is placed in the cathode circuit of thyratron 66 to serve as a reset switch in a manner which will be described subsequently.

When relay 68A energizes, 12 volts are placed across the relay so that it is held in an energized condition. The energization of relay 68A also changes the voltage across rheostat 70 and potentiometer 72 from −12 volts to +22 volts. A capacitor 74 parallels potentiometer 72. Voltage selected by potentiometer 72 is fed to the grid of a cathode follower tube 76. As capacitor 74 charges, the voltage on the grid of cathode follower tube 76 gradually increases and this increased output voltage is taken across cathode resistor 78 and fed to relay conductor 14. The output voltage, ignoring transients and nonlinear characteristics will approximate the slope voltage curve 32 of FIGURE 3. This is the curve of voltage applied to relay conductors 14 to sequentially close switching relays 18 at each detection station.

A normally closed reset switch 58C is placed in series with conductors 14 and is ganged with reset switches 58A and 58B. After the firing of a shot the circuit may be restored to a ready state by opening ganged switches 58A, 58B and 58C. Opening switches 58A and 58B de-energizes relays 56A and 68A and returns the thyratrons 54 and 66 to non-conductive states. Opening switch 58C assures that all switching relays 18 return to their normal de-energized state.

The resistance setting of rheostat 70 determines the rate at which capacitor 74 will charge and therefore determines the slope of voltage 32 (see FIGURE 3), which is applied by conductor 14 to switching relays 18. The maximum voltage $E_2$ which is placed on conductors 14 is adjusted by potentiometer 72.

Capacitor 74 is preferably of a small size, high capacitance type, which suggests the use of an electrolytic capacitor, except that all known types of electrolytic capacitors are polarized. Since the voltage across capacitor 74 switches from negative to positive when relay 68A is energized, this means that an electrolytic capacitor could not be used as required in the circuit to create a sloped voltage output. In order to overcome this undesirable polarized characteristic of electrolytic condensers, but at the same time to take advantage of their high capacitance to size and weight ratio, two such capacitors 74 are placed in series with the polarity of the capacitors arranged in back-to-back relationship. In this arrangement, regardless of the voltage placed across the capacitors, there will never be a low resistance path presented, but instead, a consistent capacitance value.

The circuit of FIGURE 6 performs substantially identically to that of FIGURE 5 except that semi-conductor components are utilized. Switch 40B introduces a voltage on an amplifying transistor 82 which controls a silicon controlled rectifier 84. Upon the closing of switch 40B the silicon controlled rectifier 84 conducts and relay 56B is energized. This occurs substantially simultaneously with the production of a voltage pulse on the base of transistor 82. When relay 56B energizes, the relay contact moves to place a voltage on capacitor 86 which starts to charge. A Zener diode 88 in series with resistor 90 assures a continuous voltage value across capacitor 86 when relay 56B is energized. In series with capacitor 86 is a rheostat 92 by which the rate of charge of capacitor 86 is controlled which, as will be apparent from further description, controls time $T_1$ as represented in the graph of FIGURE 3. When capacitor 86 is charged to a predetermined voltage, transistor 94 conducts. Transistor 94 is preferably a unijunction device having a high input resistance characteristic. When transistor 94 conducts, a second silicon controlled rectifier 96 conducts actuating relay 68B.

While relay 68B is in its normal or non-actuated state, as shown, a voltage is placed by potentiometer 98 across capacitor 100, charging it to a voltage value selected by adjustment of potentiometer 98. This initial state voltage value across capacitor 100 determines the steady state voltage across relay conductors 14, or voltage $E_1$ on the graph of FIGURE 3. When relay 68B actuates, a voltage is placed through rheostat 102 across capacitor 100 which starts to charge at a rate dependent upon the setting of rheostat 102. Thus, as will be seen from further description, rheostat 102 adjusts the slope of voltage 32, as shown in FIGURE 3, which is placed on relay conductors 14.

The voltage charge of capacitor 100 is fed to the base of an output transistor 104a which is cascaded with output transistors 104b and 104c. The final output transistor 104c functions as an emitter follower. The output of the emitter follower taken across resistor 106 is fed to relay conductors 14. When capacitor 100 is fully charged, the final voltage—i.e., the voltage $E_2$ in FIGURE 3—is determined by the collector voltage of transistor 104c. The collector voltage, in turn, is established by potentiometer 108.

A number of embellishments may be added to the circuit of FIGURE 6, such as the provision of a test switch 110 by which the performance of the circuit may be tested. The switching of test switch 110 into its upward position starts the same chain reaction of the circuit that occurs when switch 40B is opened. Other embellishments include indicator lights 112a and 112b. Light 112a indicates the circuit is ready but in a nonactivated state. Indicator light 112b is energized with relay 56B indicating that a sloped voltage is being applied to conductors 14 to activate sequentially the switching relays 18 at each detection station.

Reset switches 114A and 114B are preferably provided as means for restoring the circuit to a ready state. Opening switch 114A removes voltage from transistor 82 which results in the deactuation of relays 56B and 68B. Opening switch 114B makes sure that the switching relay 18 at each detection station is deactuated and ready for the next firing sequence. Switches 114A and 114B are preferably coupled together.

The circuits of FIGURE 5 and FIGURE 6 are exemplary only, as it is obvious that many changes may be made in the circuit arrangements and the components used to produce the necessary slope voltage to sequentially energize the switching relay 18 at each detection station. Some experimentation will be required to set the values within the circuits in each new area of geophysical prospecting. With a few test shots the value of voltages $E_1$ and $E_2$, time delay $T_1$, and slope time $T_2$ can be adjusted so that switching relays 18 are activated at the correct times (1) to switch first-kick geophones 26 out of the circuit immediately after the first-kick seismic energy has arrived at each detection station, and (2) to switch the reflection geophones 28 into the circuit to receive the subsequently arriving reflected seismic information.

If individual adjustment of the timing sequence of the closure of switching relays 18 is required, a variable resistor can be placed in series with each of the switching relays 18. Alternatively, the closing voltage necessary to close the relays can be adjusted by adjusting the spring tension of the relay closing contacts. Experience has indicated that adjustment of the switching relays 18 and the circuit components necessary to generate the proper sloped voltage at the central recording mechanism is relatively easy to achieve in each new area where geophysical prospecting is undertaken.

In this disclosure the term reflection geophones has been used to identify those geophones used to detect seismic energy arriving subsequent to the first-kick energy. This term is not used in a limiting sense as this invention is applicable to all types of geophysical prospecting. Geophones used for first-kick purposes may or may not be the same type used for reflection or refraction purposes.

This invention has been described with a certain degree of particularity, but it is clear that many changes may be made in the details of construction and the arrangements of components without departing from the spirit and scope of this disclosure.

What is claimed is:

1. A geophysical prospecting system for recording first-kick seismic energy followed by reflected seismic energy at a detection station, comprising:
   a recording mechanism;
   a pair of geophone conductors extending from said recording mechanism to said detection station;
   reflection geophone means at said detection station;
   first-kick geophone means at said detection station;
   circuit switching means at said detection station having a connection with said pair of geophone conductors, said circuit switching means adaptable to switch said pair of geophone conductors to receive energy signals from said first-kick geophone means or from said reflection geophone means; and
   means for actuating said circuit switching means at said detection station to connect said first-kick geophone means to said pair of geophone conductors extending to said detection station whereby first-kick seismic energy is conveyed to said recording mechanism and subsequent to the receipt at said detection station of said first-kick seismic energy to connect said reflection geophone means to said pair of geophone conductors whereby seismic energy received subsequent to said first-kick seismic energy is conveyed to said recording mechanism.

2. A geophysical prospecting system according to claim 1 wherein said circuit switching means includes two-position relay means, said relay means in a first position connecting said first-kick geophone means to said pair of geophone conductors and in a second position connecting said reflection geophone means to said pair of geophone conductors.

3. A geophysical prospecting system according to claim 2 wherein said relay means connects said first-kick geophone means to said pair of record conductors when said relay means is in its normal non-actuated state and connects said reflection geophone means to said pair of record conductors when said relay means is in its actuated state.

4. A geophysical prospecting system according to claim 2 wherein said means for actuating said circuit switching means comprises a pair of electrical conductors connected to said relay means and extending to said recording mechanism, and means for introducing a slope voltage onto said pair of electrical conductors at said recording mechanism.

5. In a geophysical prospecting apparatus including means for imparting seismic energy into the earth at a point near the surface thereof, and means for recording the arrival times of surface wave and reflected portions of said energy at a near surface station spaced from said point, said surface wave portion arriving prior to said reflected portion at said station, the improvement which comprises: first transducer means at said station of a character to generate an electrical signal in response to the arrival of said surface wave portion, second transducer means at said station of a character to generate an electrical signal in response to the arrival of said said reflected portion, electrical circuit means actuatable to sequentially and separately connect said first transducer means and said second transducer means in that sequence to said recording means, and means to actuate said electrical circuit means between the arrivals of said surface wave portion and said reflected portion.

6. An apparatus as defined in claim 5 in which the first transducer means comprises a single geophone and said second transducer means comprises a plurality of geophones.

7. In a geophysical prospecting system including means for imparting seismic energy into the earth at a seismic disturbance point near the surface thereof, geophones for detecting the arrival of surface wave and reflected portions of said energy at a plurality of near-surface detection stations spaced in a linear array from said disturbance point, said surface wave portion arriving prior to said reflected portion at each said detection station, recording means at said disturbance point for recording signals generated by said geophones, and a cable containing pairs of electrical conductors for conducting signals between said detection stations and said recording means, the improvement which comprises: an electrically actuatable two-position relay at each said detection station, the relay at each said station adapted in a first position to connect a single one of the geophones at its respective station to a separate one of said pairs of electrical conductors and in a second position to connect a plurality of the geophones at its respective station to the same said single one of said pairs of electrical conductors, means to apply a sloping electrical voltage to a second separate one of said pairs of electrical conductors at said disturbance point, said second separate pair of electrical conductors connecting all of said relays in parallel in a manner to enable separate actuation of said relays in response to said voltage.

References Cited by the Examiner

UNITED STATES PATENTS

| Re. 22,535 | 8/1944 | Shimek | 340—15.5 |
|---|---|---|---|
| 2,340,272 | 1/1944 | McCarty | 181—.5 |
| 2,369,082 | 2/1945 | Shook et al. | 340—15.5 |

BENJAMIN A. BORCHELT, *Primary Examiner.*

CHESTER L. JUSTUS, *Examiner.*

J. W. MILLS, R. M. SKOLNIK, *Assistant Examiners.*